United States Patent
Deshmukh et al.

(10) Patent No.: US 8,862,554 B2
(45) Date of Patent: Oct. 14, 2014

(54) METHODS AND ARRANGEMENTS FOR PRIORITIZING SERVICE RESTORATION ACTIVITIES IN THE EVENT OF A CATASTROPHIC FAILURE

(75) Inventors: Om Dadaji Deshmukh, New Delhi (IN); Sameep Mehta, New Delhi (IN); Vinayaka D. Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/952,774

(22) Filed: Nov. 23, 2010

(65) Prior Publication Data

US 2012/0130957 A1     May 24, 2012

(51) Int. Cl.
  *G06F 17/30*   (2006.01)
  *G06Q 30/02*   (2012.01)

(52) U.S. Cl.
  CPC .................................. *G06Q 30/02* (2013.01)
  USPC ......................................... 707/686; 707/682

(58) Field of Classification Search
  CPC ................... Y10S 707/99933; Y10S 707/922; Y10S 707/99936; G06F 17/30; G06F 17/30663; G06F 17/30864
  USPC ......... 707/600, 602, 603, 674, 676, 677, 678, 707/679, 680, 681, 682, 683, 684, 685, 686, 707/748, 758, 812, 752, 753, 754; 705/7.11, 7.32, 7.38, 7.41
  See application file for complete search history.

(56) References Cited

U.S. PATENT DOCUMENTS

| | | | |
|---|---|---|---|
| 6,427,132 B1 * | 7/2002 | Bowman-Amuah | 703/22 |
| 7,895,273 B1 * | 2/2011 | Haldar | 709/206 |
| 8,095,613 B1 * | 1/2012 | Perkowitz et al. | 709/207 |
| 2002/0194047 A1 | 12/2002 | Edinger et al. | |
| 2003/0103452 A1 * | 6/2003 | Le et al. | 370/229 |
| 2004/0034553 A1 | 2/2004 | Cole et al. | |
| 2005/0215229 A1 | 9/2005 | Cheng | |
| 2006/0218440 A1 * | 9/2006 | Inoue | 714/12 |
| 2007/0299702 A1 | 12/2007 | Rigdon et al. | |
| 2010/0094677 A1 | 4/2010 | Peltz et al. | |

(Continued)

FOREIGN PATENT DOCUMENTS

WO     WO 02079936     10/2002

OTHER PUBLICATIONS

Kesner, Richard M., "IT Service Delivery: Models and Frameworks", published in Enterprise Operations Management, available at http://www.auerbach-publications.com/dynamic_data/2467_1359_42-40-30.pdf, as of Jun. 25, 2010.

(Continued)

*Primary Examiner* — Greta Robinson
(74) *Attorney, Agent, or Firm* — Ference & Associates LLC

(57) ABSTRACT

Methods and arrangements for prioritizing customer service restoration, in the event of service failure or compromise such that any adverse effect of the service disruption on the customer is minimized, the perceived drop in quality of service, if any, is minimized and timely and efficient resource reallocation for service restoration is achieved. Input data relating to customer service protocols is assimilated. A service restoration order is implemented responsive to a service disruption and based on the assimilated input data. This implementing includes determining bufferable and non-bufferable services, postponing restoration of the bufferable services, and determining an order of priority of the non-bufferable services.

12 Claims, 4 Drawing Sheets

(56) References Cited

U.S. PATENT DOCUMENTS

| | | | |
|---|---|---|---|
| 2010/0115061 A1* | 5/2010 | Tai et al. | 709/219 |
| 2010/0165830 A1* | 7/2010 | Amir et al. | 370/216 |
| 2010/0329647 A1* | 12/2010 | Kim et al. | 386/326 |

OTHER PUBLICATIONS

Trouble and Complaint Handling, published Mar. 5, 2007, Sprint—GSA, FTS Networx Enterprise, vol. 2 Management, Section 9, available at https://networx.sprint.com/content/pdf/redactedContract/EV2_09_Trouble_Complaint_and_Handling.pdf, as of Jun. 25, 2010.

Aztec Essential Technologies, Problem Severity and Priority, available online Jun. 25, 2010 at http://www.aztecsystems.com/_contact/contact_support_2007.asp, as of Jun. 25, 2010.

Association of Support Professionals, "Timberline's Tips on Turning Customer Service Into an Award Winner", available online Jun. 25, 2010 at http://www.asponline.com/timberline.html, as of Jun. 25, 2010.

* cited by examiner

US 8,862,554 B2

METHODS AND ARRANGEMENTS FOR PRIORITIZING SERVICE RESTORATION ACTIVITIES IN THE EVENT OF A CATASTROPHIC FAILURE

BACKGROUND

Generally, in the customer service field, customer-facing units (e.g., contact centers) are normally tasked with delivering efficient and reliable service on behalf of the companies they are representing. It does happen that one or more components of the service can fail, through technical or other problems, or otherwise provide compromised or sub-standard service. Typically, resource re-allocation for service restoration is undertaken on an unplanned, ad-hoc basis, with inconsistent results. In this context, the effect of service disruption on the customer is rarely taken into account while attempts are made to restore service.

BRIEF SUMMARY

In summary, one aspect of the invention provides a method comprising: assimilating input data relating to customer service protocols; and implementing a service restoration order responsive to a service disruption and based on the assimilated input data; the implementing comprising: determining bufferable and non-bufferable services;
  postponing restoration of the bufferable services; and
    determining an order of priority of the non-bufferable services.

Another aspect of the invention provides an apparatus comprising: one or more processors; and a computer readable storage medium having computer readable program code embodied therewith and executable by the one or more processors, the computer readable program code comprising: computer readable program code configured to assimilate input data relating to customer service protocols; and computer readable program code configured to implement a service restoration order, responsive to a service disruption and based on the assimilated input data, via: determining bufferable and non-bufferable services; postponing restoration of the bufferable services; and determining an order of priority of the non-bufferable services.

An additional aspect of the invention provides a computer program product comprising: a computer readable storage medium having computer readable program code embodied therewith, the computer readable program code comprising: computer readable program code configured to assimilate input data relating to customer service protocols; and computer readable program code configured to implement a service restoration order, responsive to a service disruption and based on the assimilated input data, via: determining bufferable and non-bufferable services; postponing restoration of the bufferable services; and determining an order of priority of the non-bufferable services.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
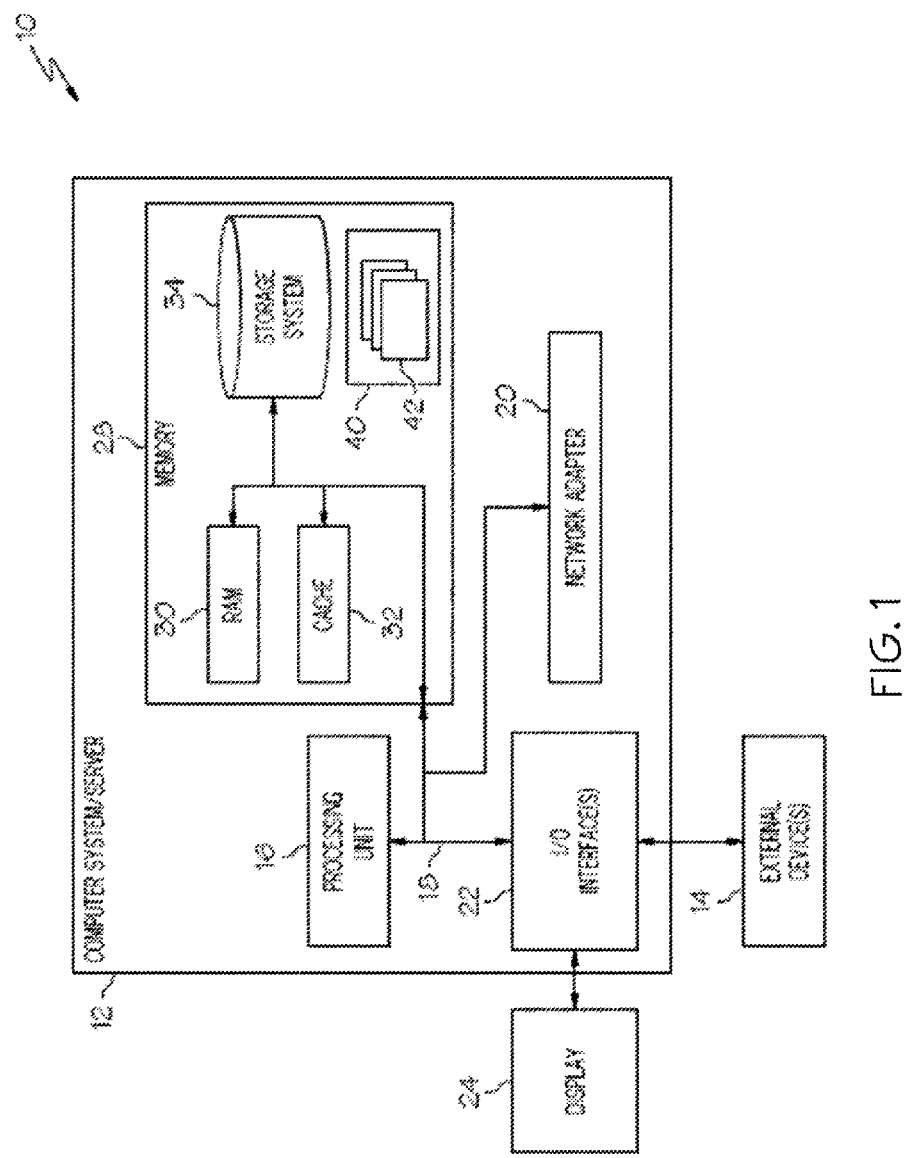
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
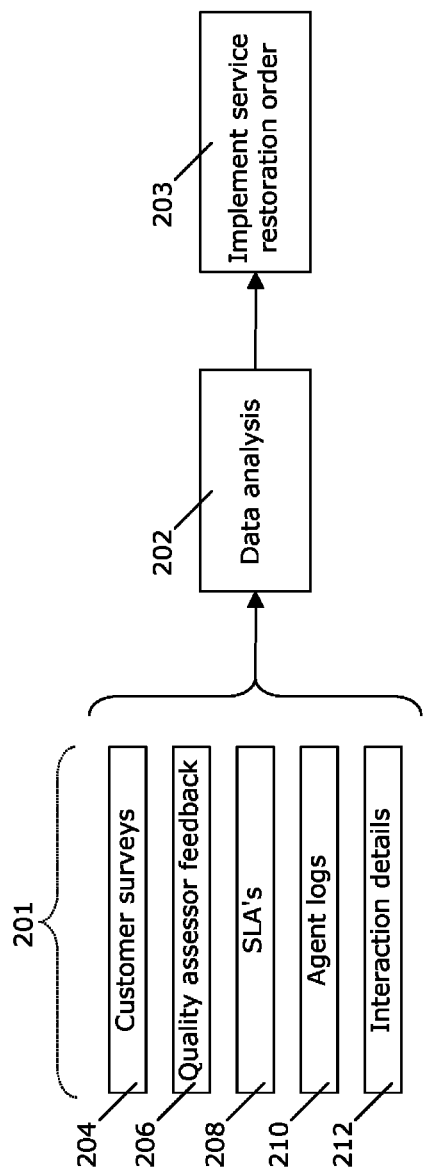
FIG. 2 schematically illustrates an arrangement for assimilating data in developing a service restoration order.
Figure 3:
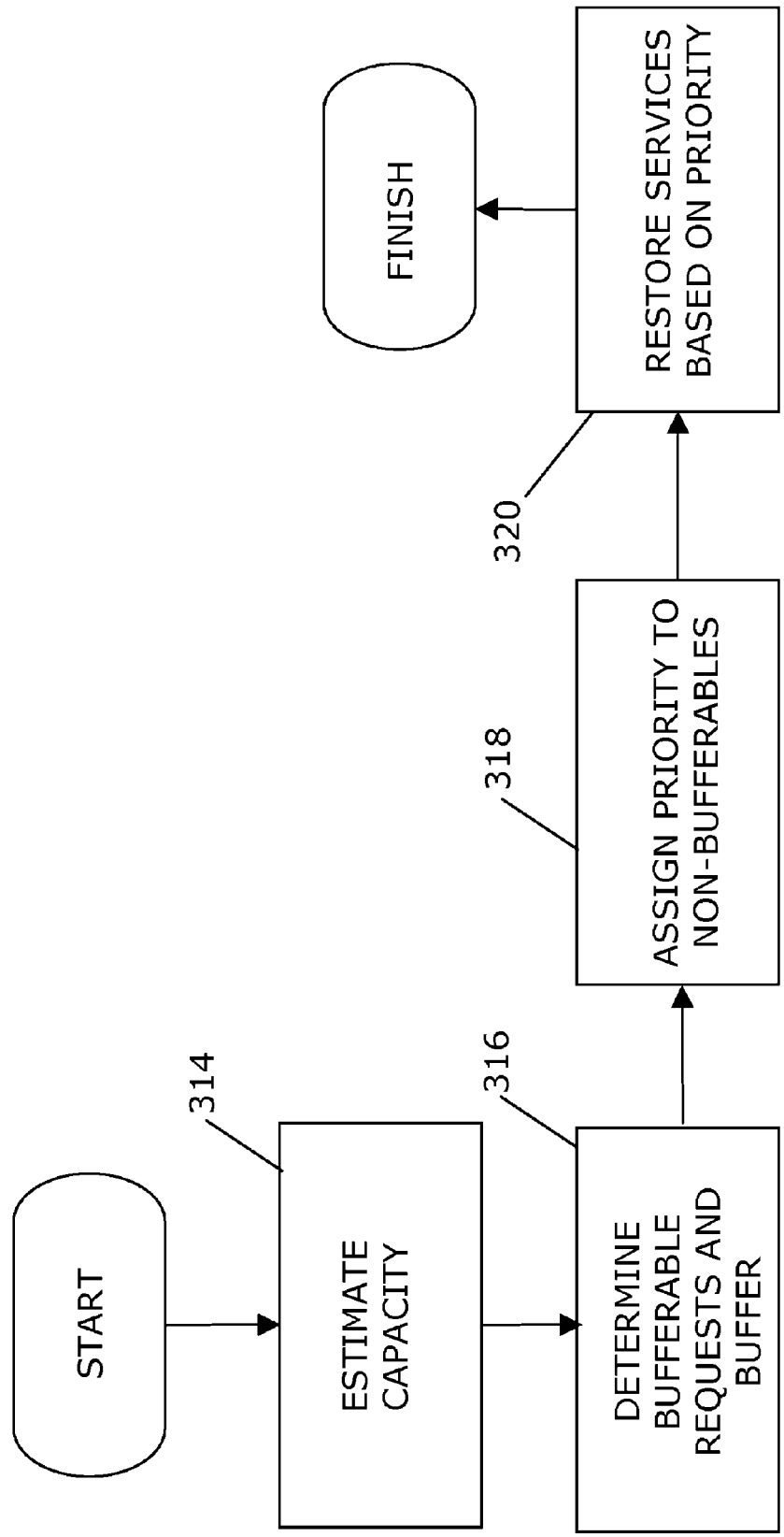
FIG. 3 sets forth a process for implementing a service restoration order.

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2 and 3 can be performed or utilized by way of a processing unit or units and system memory such as those indicated, respectively, at 16 and 28 in FIG. 1, whether on a server computer, a client computer, a node computer in a distributed network, or any combination thereof.

Broadly contemplated herein, in accordance with at least one embodiment of the invention, are methods and arrangements for prioritizing customer service restoration, in the event of service failure or compromise such that any adverse effect of the service disruption on the customer is minimized, the perceived drop in quality of service, if any, is minimized and timely and efficient resource reallocation for service restoration is achieved.

Generally, it can be appreciated that an optimal order of importance relating to service-components and/or service-restoration can depend on the product or the service offered, the customer base, the location or general geographical area being catered to, the time of service, and the type and nature of the interaction involved.

By way of an illustrative and non-restrictive example, in a credit-card contact center, customers who report a stolen card are normally regarded as critical cases to handle, since the mere passage of time can significantly increase the risk of financial loss for the customer. Accordingly, this would easily represent a a task that warrants a high priority during a service disruption.

In another illustrative and non-restrictive example, a service disruption could be faced in which following standard protocols could nonetheless still result in a significant number of dropped calls. The question then may arise as to which standard protocols could be amended, reduced or eliminated to improve the AHT (average hold time) without much perceived difference in customer service quality.

In accordance with yet another illustrative and non-restrictive example, certain tasks of a credit-card contact center might be "bufferable". For instance, it is possible that an address verification call to a new credit card applicant can wait for a day or so without adversely affecting overall customer satisfaction. Accordingly, a reasonable query can be raised as to whether such "bufferable" actions can be advantageously exploited during a restoration from a service disruption, e.g., by specifically designating any such actions for postponement.

FIG. 2 schematically illustrates an arrangement for assimilating data in developing a service restoration order. In accordance with at least one embodiment of the invention, a variety of input data sources 201 are employed to readily provide useful information that can assist in an efficient resolution of customer service disruptions in manner to avoid a significant compromise in customer service satisfaction levels, or even enhance such levels. As such, input data is compiled and analyzed (202) and then, as needed, employed in implementing a service restoration order (203) that is suitably tailored for the service disruption that may occur.

As shown, one example of an input data source 201, in accordance with at least one embodiment of the invention, is customer surveys 204. These can determine, among other things: customer perception of quality of service; service aspects that might warrant improvement, or might have had a significantly positive impact on customers; service aspects that might warrant a "critical" designation; aspects of the customer service protocol that the customers might find to be superfluous or non-essential (e.g., customers may not feel they greatly benefit from information about new services that might be announced at the end of a call).

Another example of an input data source 201, in accordance with at least one embodiment of the invention, is feedback from quality assessors (206). This can provide, among other things, a deep and experienced knowledge and understanding of the expertise and limitations of agents, of the products or services themselves, and of general customer expectations. One task that could be undertaken here, for instance, is to highlight "most severe" deviations on a per-interaction basis. In other words, those agent-customer interactions which deviate from best practices, a "gold standard" or other metrics can be noted, with those showing particularly high or severe deviations being reported.

Yet another example of an input data source 201, in accordance with at least one embodiment of the invention, is service level agreements (SLA's) 208. From here, it can be determined, among other things, as to what a potential impact might be if services are disrupted or not handled, and can provide cost-benefit analyses of, e.g., a penalty that might be suffered due to missing an SLA vs. the cost of meeting the SLA by prioritizing the associated service. In other words, prioritizing one service might well serve to de-prioritize another service, and the cost-benefit analysis can help appreciate the system-wide impact of prioritizing or de-prioritizing one service with respect to one or more others.

A further example of an input data source 201, in accordance with at least one embodiment of the invention, is agent logs 210. This can determine or assimilate, for example, a perception of what factors affected a customer the most as well as any real-time issues that might have been faced by an agent.

An additional example of an input data source 201, in accordance with at least one embodiment of the invention, is details of an agent-customer interaction (212). Such details could include, for example, who the customer was, what the transaction type was, what the realized transaction view was and the level of time and resources required. Such details can easily be derived from call recordings, whereby much qualitative information (e.g., the sentiment of a customer) can be derived that would likely not be apparent merely from agent logs.

In accordance with at least one embodiment of the invention, data sources 201 such as those discussed above (which are provided by way of illustrative and non-restrictive examples) are employed to provide data that is analyzed (202) to implement a service restoration order (203) to help assign priority to tasks in the event of a service disruption. The relative severity of various aspects of the service is determined, as well as the dependence of perceived quality on various service parameters. The relative consumption of different resources (e.g., infrastructure, agent, time) of different services is assessed, and the effect of following different variants of the protocols for a service is inferred. Such inferences can be made both via simulation and selective sampling during BAU (business-as-usual) service delivery.

In accordance with an illustrative embodiment of the invention, implementation of a service restoration order (203) can be based, among other things, on critical services identified by the customers in the surveys 205, and by an assessment of agents (e.g., agents or domain experts on the service provision side) on the importance of different services for customer satisfaction, weighting of these two by domain experts, and ordering the services according to their criticality from point of view of customer satisfaction and of the provision of service guarantees. Once the system has two lists relating to the relative importance of services, one from the customer side and one from the service provision side, the weighting can then be undertaken. Relative weighting of customer-side input against service provision-side input can be set essentially in any manner deemed suitable.

As an example, prioritizing according to criticality can ensure that customers do not suffer financial loss even though a "lost card complaint" may not be seen as critical from the customer surveys 205. Further, in accordance with at least one embodiment of the invention, based on customer surveys, and historic data on previous interactions (service, protocols followed, outcome), resource requirement for different variants of protocols for each service type can be identified while the potential benefits or loss due to following different variants can be assessed. For example, if a protocol involves skipping a promotion at the end of a call may save one minute of interaction, yet it still may be revealed, e.g., that 0.5% of interactions in which such promo is not skipped indeed results in an "up-sell".

FIG. 3 sets forth a process for implementing a service restoration order (such as occurs at step 203 in FIG. 2), in accordance with at least one embodiment of the invention.

First, after a service disruption, capacity is estimated (in terms of resources and time lost), 314. Such information can be inferred from the system in use itself For instance, it can readily be determined as to how many customers were on the phone or logged on at the time of the disruption Next, a decision is made on a set of requests that can be buffered until, and thereupon buffering them (316). The identification of such requests can come about, for example, via data mining.

The remaining (non-bufferable) service types, or service types that were decided not to be postponed or buffered, are then ordered according to their criticality and their capacity requirement (318). These factors, criticality and capacity requirement, can be weighted as deemed appropriate. For example, a service type which ranks third in criticality and requires higher capacity may yet be ordered after a service type which ranks fourth in criticality but requires much less capacity. Information suitable for this step can also be derived from data mining.

Finally, services are restored (320) in the order determined in 318 without violating capacity requirements at any time. For each service type, a protocol variant is chosen which provides a desirable balance in terms of the time required and potential benefit/loss. In accordance with at least one embodiment of the invention, a service is not restored unless sufficient capacity is present to handle that service.

While embodiments of the invention, as discussed and contemplated herein, are readily applicable to high-volume call centers where agents handle customer phone calls, it should be appreciated that they are also readily applicable to other settings such as automatic online customer interaction (e.g., online banking), or online services where there is direct communication (e.g., chat) between an agent and a customer.

Figure 4:
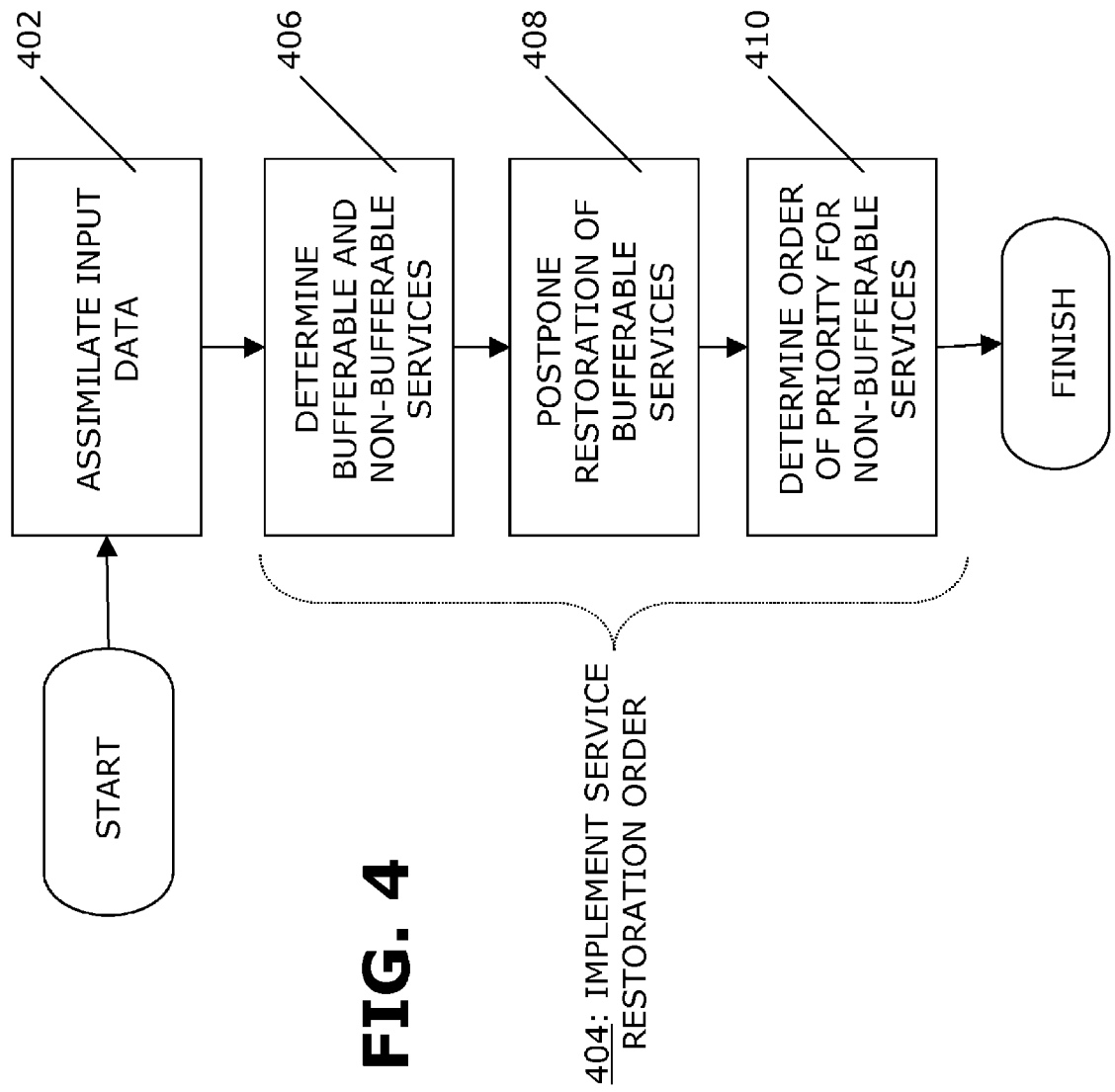
FIG. 4 sets forth a process more generally for service restoration.

FIG. 4 sets forth a process more generally for implementing a service restoration order, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 4 can be performed by way a processing unit or units and system memory such as those indicated, respectively, at 16 and 28 in FIG. 1.

As shown in FIG. 4, input data relating to customer service protocols is assimilated (402). A service restoration order is implemented (404) responsive to a service disruption and based on the assimilated input data. This implementing includes determining bufferable and non-bufferable services (406), postponing restoration of the bufferable services (408), and determining an order of priority of the non-bufferable services (410).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    assimilating, in a customer service context, input data relating to customer service protocols; and
    implementing, in a customer service context, a service restoration order responsive to a service disruption and based on the assimilated input data;
    said implementing comprising:
    estimating available system capacity upon service disruption;
    determining, among services to be restored, services which are bufferable and services which are non-bufferable, the bufferable services comprising services for which restoration is to be postponed in favor of restoring the non-bufferable services;
    postponing restoration of the bufferable services; and
    determining an order of priority of the non-bufferable services;
    wherein said determining of an order of priority comprises determining a criticality of each of the non-bufferable services and assessing a capacity requirement of each of the non-bufferable services;
    said determining of an order of priority further comprising assigning weights to the criticalities; and
    restoring the non-bufferable services based on the determined order of priority.

2. The method according to claim 1, wherein said determining of an order of priority further comprises assigning weights to the capacity requirements of the non-bufferable services.

3. The method according to claim 1, wherein said determining of a criticality comprises combining an assessment from a customer-side source with an assessment from a service provision-side source.

4. The method according to claim 1, wherein said implementing further comprises restoring non-bufferable services without violating any service capacity requirements.

5. The method according to claim 1, wherein said assimilating comprises assimilating input data from one or more taken from the group consisting of: customer surveys; feedback from quality assessors; service level agreements; agent logs; and details of agent-customer interactions.

6. An apparatus comprising:
    one or more processors; and
    a computer readable storage medium having computer readable program code embodied therewith and executable by the one or more processors, the computer readable program code comprising:
    computer readable program code configured to assimilate, in a customer service context, input data relating to customer service protocols; and
    computer readable program code configured to implement, in a customer service context, a service restoration order, responsive to a service disruption and based on the assimilated input data, via:
    estimating available system capacity upon service disruption;
    determining, among services to be restored, services which are bufferable and services which are non-bufferable, the bufferable services comprising services for which restoration is to be postponed in favor of restoring the non-bufferable services;
    postponing restoration of the bufferable services; and
    determining an order of priority of the non-bufferable services;
    wherein said computer readable program code is configured to determine an order of priority via determining a criticality of each of the non-bufferable services and assessing a capacity requirement of each of the non-bufferable services;
    said determining of an order of priority further comprising assigning weights to the criticalities; and
    said computer readable program code is configured to restore the non-bufferable services based on the determined order of priority.

7. The apparatus according to claim 6, wherein said computer readable program code is configured to assimilate input data from one or more taken from the group consisting of: customer surveys; feedback from quality assessors; service level agreements; agent logs; and details of agent-customer interactions.

8. A computer program product comprising:
    a computer readable storage medium having computer readable program code embodied therewith, the computer readable program code comprising:
    computer readable program code configured to implement, in a customer service context, a service restoration order, responsive to a service disruption and based on the assimilated input data, via:
    estimating available system capacity upon service disruption;
    determining, among services to be restored, services which are bufferable and services which are non-bufferable, the bufferable services comprising services for which restoration is to be postponed in favor of restoring the non-bufferable services;
    postponing restoration of the bufferable services; and
    determining an order of priority of the non-bufferable services;
    wherein said computer readable program code is configured to determine an order of priority via determining a criticality of each of the non-bufferable services and assessing a capacity requirement of each of the non-bufferable services;
    said determining of an order of priority further comprising assigning weights to the criticalities; and said computer readable program code is configured to restore the non-bufferable services based on the determined order of priority.

9. The computer program product according to claim 8, wherein said computer readable program code is further configured to determine an order of priority via assigning weights to the capacity requirements of the non-bufferable services.

10. The computer program product according to claim 8, wherein said computer readable program code is configured to determine a criticality via combining an assessment from a customer-side source with an assessment from a service provision-side source.

11. The computer program product according to claim 8, wherein said computer readable program code is further configured to restore non-bufferable services without violating any service capacity requirements.

12. The computer program product according to claim 8, wherein said computer readable program code is configured to assimilate input data from one or more taken from the group consisting of: customer surveys; feedback from quality assessors; service level agreements; agent logs; and details of agent-customer interactions.

* * * * *